(12) United States Patent
Krenzke et al.

(10) Patent No.: US 6,338,097 B1
(45) Date of Patent: Jan. 8, 2002

(54) CROSS APPLICATION TIME SHEET FOR COMMUNICATING WITH ONE OR MORE ENTERPRISE MANAGEMENT APPLICATIONS DURING TIME DATA ENTRY

(75) Inventors: Ralf Krenzke, St. Leon-Rot; Georg Dopf, Schwetzingen; Stefan Hirschenberger, Walldorf; Ralf Dentzer, Hockenheim, all of (DE)

(73) Assignee: SAP Aktiengesellschaft (DE)

( * ) Notice: Subject to any disclaimer, the term of this patent is extended or adjusted under 35 U.S.C. 154(b) by 0 days.

(21) Appl. No.: 09/100,257

(22) Filed: Jun. 19, 1998

(51) Int. Cl.[7] .............................. G07C 1/10; G06F 9/54; G06F 17/60
(52) U.S. Cl. ........................... 709/329; 709/328; 705/8; 705/9; 705/32
(58) Field of Search ..................... 700/14, 17; 702/176, 702/178, 187; 705/11, 32, 7–9; 709/328, 329

(56) References Cited

U.S. PATENT DOCUMENTS

| | | | |
|---|---|---|---|
| 4,819,162 A | | 4/1989 | Webb, Jr. et al. ............. 705/32 |
| 4,847,791 A | | 7/1989 | Martin et al. ................ 702/178 |
| 5,600,554 A | * | 2/1997 | Williams ........................ 705/1 |
| 5,717,867 A | * | 2/1998 | Wynn et al. ................... 705/32 |
| 5,765,140 A | * | 6/1998 | Knudson et al. ................ 705/9 |
| 5,910,010 A | * | 6/1999 | Nishizawa et al. ........... 438/15 |
| 5,991,742 A | * | 11/1999 | Tran ............................. 705/32 |
| 6,049,776 A | * | 4/2000 | Donnelly et al. ............... 705/8 |

FOREIGN PATENT DOCUMENTS

EP 0434875 3/1991

* cited by examiner

Primary Examiner—Thomas Lee
Assistant Examiner—Ilwoo Park
(74) Attorney, Agent, or Firm—Chadbourne & Park LLP

(57) ABSTRACT

A data model for a supply chain is provided whereby individual working steps in a production process are defined as activities, and organized groups of such activities are defined as orders. Activities are allocated to no more than one resource and contain information concerning the start and finish time for the activity, any resource on which the activity is currently scheduled, and a list of alternative resources, if any. Activities are linked to each other via auxiliary objects, which contain information concerning the minimum and maximum time between activities. Orders may contain input and/or output interface nodes, representing the materials consumed and produced by the offer. Each output interface node representing a quantity of material created from one order is linked via an auxiliary object to respective input interface node or nodes from other orders that are scheduled to receive that material. Order anchors are defined whereby a planning algorithm can easily reference an order by its order number in a database table. Planning object anchors allow the planning algorithm to access all the orders for a given material, and resource anchors permit access to all activities scheduled for that resource.

56 Claims, 9 Drawing Sheets

CROSS APPLICATION TIME SHEET

TIME  EDIT  GOTO  SYSTEM  HELP

SAVE + CONFIRM | TRAVEL EXPENSES | WITHDRAWAL

PERSONNEL NO.  10000002   A BEAVIS
WEEK  20.1996   13.05.1996   19.05.1996          POSTING DATE  29.05.1996

ALLOCATIONS

| NETWORK | ACT. | ELEV | CAT | SPL | DESCRIPTION | PLAN. WORK | ACT. WORK | REMAINING |
|---|---|---|---|---|---|---|---|---|
| 900001 | 0070 | | PER | 1 | | 150.0 | 35.0 | 100.0 |
| 900001 | 0100 | | PER | 1 | | 400.0 | 37.0 | 233.0 |
| 900202 | 0010 | | PER | 1 | | 700.0 | 10.0 | 700.0 |
| 900204 | 0020 | | PER | 2 | | 150.0 | 0.0 | 150.0 |
| | | | | 0 | | 0.0 | 0.0 | 0.0 |

TIME SPENT THIS WEEK

| RECEIVER WBS ELEMENT | REC. CCtr | RECCOSTOBJ | SEND. CCTR | SUM | MO | TU | WE | TH | FR | SA |
|---|---|---|---|---|---|---|---|---|---|---|
| P. 666 | | | 12983476 | 0.0 | 1.0 | 2.0 | | | | |
| P. 667.5 | 4353444 | | 12983476 | 3.0 | 5.0 | | | | 3.0 | |
| | | | 34342222 | 5.0 | 1.0 | | | | | |
| P. 66463 | | | 12983476 | 3.0 | | 2.0 | | 4.0 | | |

510

500

ZAB (1) (001) | HS0046 | OVR | 04:09PM

CROSS APPLICATION TIME SHEET FOR COMMUNICATING WITH ONE OR MORE ENTERPRISE MANAGEMENT APPLICATIONS DURING TIME DATA ENTRY

BACKGROUND OF THE INVENTION

Organizations are finding it increasingly difficult to compete in the international marketplace as markets become more global. The increasing competition in many areas of manufacturing, commerce, services, and other forms of business leads to sinking market prices, which in turn causes profit margins to decrease. Meanwhile, rapidly changing technologies lead to greater automation, which increases efficiency and allows corporations to produce more with fewer employees.

However, with the increased pressure on reducing costs, organizations find that they must also optimize use of their human resources. There is a growing trend in costs associated with employees on a per-capita basis, due to increases in salaries and benefits. While sophisticated methods of tracking costs associated with raw material, machinery, rent, shipping, and the like have existed for decades and are still constantly improving, there is a need to track and allocate time spent by employees and contract workers in a sophisticated manner that allows management to improve upon the traditional methods of human resource allocation, verification, approval, and planning.

Information on when an employee has performed work and for what reason is important for different areas of the organization, such as personnel administration, logistics, and accounting. A uniform record of hours worked would allow a great simplification of the work flow in the organization.

Presently, time sheet entries and processing are often done on a micro-level. Time entries inputted by employees in a department are added together by project or by division, and management receives a weekly or monthly report that does little more than provide the totals for that particular department. When a project involves several departments working on diverse aspects of the project, it is often difficult to ascertain the total time spent by the various individuals and the costs associated with that time. Very often a given individual may spend a certain number of hours accomplishing a particular task that provides benefits to several projects, in which case it is difficult to correctly and accurately determine each project's share of the benefit. For example, a salesperson working for a large corporation may take several trips to visit a customer's facilities to better ascertain the needs of the customer and to build a good working relationship. The time spent on such trips, as well as time spent building and maintaining relationships may be difficult to track in the first place, let alone accurately assign to various projects in which the customer is involved. Similarly, a researcher may discover a method of improving efficiency in a manufacturing process that may be applied to several ongoing projects. As another example, an individual working in the Information Services department of the organization may spend various amounts of time on different projects such as system maintenance, upgrading computers for individuals across several departments, making purchasing decisions, and attending trade shows.

Furthermore, it would be efficient from the organization's point of view to have various departments in the organizations view the time entries of the above individuals. For example, a project manager may wish to determine whether there are enough people working on the project and whether those people are allocating sufficient time for it. Human resources may want to ascertain that employees are correctly allocated to various projects, and to determine whether more employees with particular qualifications need to be hired. Accounting would need to add up the costs associated with different projects to ensure that there are no overruns.

Presently, there is a need for a system to track time sheet information and compile data for such various applications, without utilizing a complex network of links to coordinate and distribute data. It would be advantageous to have an effective method of tracking time entries and compiling time sheet information to provide information on internal employees' and external service providers' working times for a variety of applications.

SUMMARY OF THE INVENTION

The present invention relates to a method for compiling time entry data in a common or joint data pool and providing the data to multiple applications. By combining data and storing it in one central system, the data may be asynchronously distributed, either automatically or on a needed basis. A transparent system allows additional processing, such as verification and approval, on separate portions of the data pool before the data is distributed. Corrections or updates to the data are automatically forwarded to the relevant applications.

An object of the invention is to provide a novel method of compiling time entry data from a variety of sources in a data pool and providing the data to several applications.

Another object of the invention is to monitor time entry data and the information derived from them.

Another object of the invention is to improve transparency in the sharing of time entry data across applications.

Another object of the invention is to automatically and asynchronously distribute compilations of time entry data.

Another object of the invention is to apply asynchronous processing on time entry data to be distributed to several applications.

Another object of the invention is to automatically forward corrected or updated time entry data to several applications.

BRIEF DESCRIPTION OF THE DRAWINGS

FIG. 3 is an example of a preferred embodiment of a request screen.

FIG. 4 is an example of a preferred embodiment of a data entry screen.

FIG. 5 is another example of a preferred embodiment of a data entry screen.

FIG. 6 is an example of a preferred embodiment of a travel data entry screen.

FIG. 7 is an example of a preferred embodiment of a goods issue screen.

DETAILED DESCRIPTION OF THE INVENTION

Introduction

Figure 1:
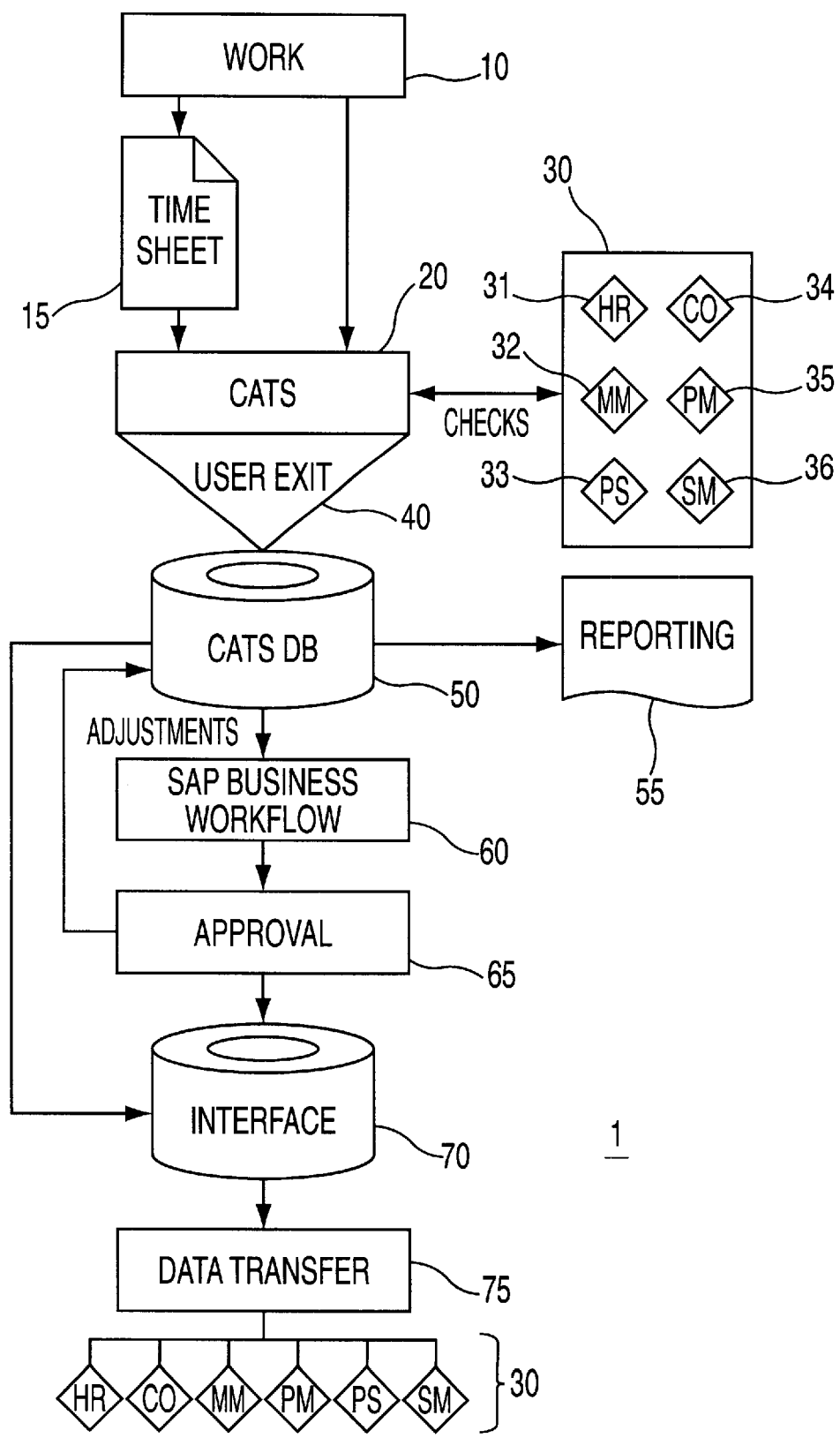
FIG. 1 is a flowchart representing an overview of the process utilized by CATS.

The present invention allows time entries to be managed in an efficient manner through the centralization and subsequent distribution of relevant data.

The present invention was developed as a standardized, cross-application tool of the SAP R/3 System. A brief description of the R/3 System follows.

R/3 can be described primarily as an online transaction processing system designed to provide integrated processing of all business routines and transactions. It includes enterprise-wide, integrated solutions, as well as specialized applications for individual, departmental functions. R/3 mirrors all of the business-critical processes of the enterprise—finance, manufacturing, sales, and human resources. It also offers various analytical capabilities to supplement the transaction processing function.

Recent paradigm shifts have forced companies to optimize all business processes along the net-value-added chain through the use of modern data processing and enterprise-wide information management. In order to become successful, companies often network with customers and suppliers such that products and services of high quality can be made available with minimal delay in response to customer demands. R/3 achieves these goals with online integration of data in the company.

The R/3 System is based on SAP's client/server architecture which separates the database, application, and presentation components for greater flexibility. This enables enterprises to take advantage of the various benefits of the architecture, including the capability to run across a variety of today's most popular UNIX-based hardware platforms. The R/3 System is designed so that the application systems and system functions are decoupled by a clear layer of architecture, with an application layer and a basis layer. The multilayer architecture of the R/3 System allows optimal load distribution, even in large installations with thousands of users. It has a modular structure with methods for controlling master-slave relationships between individual software components. Special servers linked by communications networks can be used for certain tasks without losing the integration of data and processes in the overall system. Implementation of separate servers for particular tasks makes optimal use of the performance potential and the different cost structures of available hardware architecture. This allows applications to be partitioned into different services and run on different servers. The fundamental services of the R/3 system (graphical presentation services, application services for handling of the application logic, database services for storage and recovery of business data, etc.) are partitioned and may evolve separately while maintaining interoperability.

The present invention is contemplated for use in conjunction with several applications of the SAP R/3 System, namely Controlling, Personnel Time Management (part of Human Resources), Service Management, Plant Maintenance, Project System, and External Services (part of Materials Management). It will be appreciated that the invention may be practiced using different hardware and operating system platforms. The invention as described operates as a module of a larger system.

The following description is of the best presently contemplated mode of carrying out the present invention. This description is not to be taken in a limiting sense but is made merely for the purpose of describing the general principles of the invention.

Overview

Cross application time sheets ("CATS") is a system that allows personal time sheet records to be entered for individuals performing duties for an organization. In a preferred embodiment, such time sheet records may be associated with the organization's own employees (internal employees) or outsiders, such as contractors or consultants (external employees), collectively referred to as "employees", wherein each employee is assigned an employee number in the system (the records of CATS data are always related to individuals). Also in a preferred embodiment, administrators may enter the working time of all employees assigned to them.

Referring to FIG. 1, flowchart 1 represents an overview of the process utilized by CATS. The amount of time that work 10 is performed by employees is either recorded directly on the system using CATS interface 20 or through a time sheet 15 that is subsequently recorded centrally in a recordation office using CATS interface 20. In preferred embodiments of the invention, the recordation office may be at one physical location, or may be a "virtual" office that is distributed across a network. A user accessing the system may perform checks with applications 30, which in a preferred embodiment includes Personnel Time Management 31, External Services 32, Project System 33, Controlling 34, Plant Maintenance 35, and Service Management 36. These checks include checking the work list while in the request mode, and verifying information in the data entry mode (described in more detail below). In a preferred embodiment, additional customer enhancements may be applied using user exit 40.

Data is subsequently passed on to database 50 for storage. From database 50 it is possible to report 55 the data. Depending on the customized settings of the system, approval of the data by an authorized individual may be required. If no approval is required, the data is passed to interface database 70. If approval for any portion of the data is required, business workflow selection process 60 determines the type of approval and authorization that is required, and approval process/authorization procedure 65 commences. If any adjustments or corrections to the time sheet data is made during approval process/authorization procedure 65, the adjusted or corrected data is sent back to database 50. On the other hand, data that is approved and require no adjustments or corrections are passed to interface database 70. Interface database 70 stores data that is passed via data transfer 75 to one or more applications within applications 30.

Entering, Saving, and Releasing Data

The type of data entered comprises working times together with information that is relevant to further processing and evaluation of data in various areas of the system. By way of example only, the information can relate to documenting the progress of an order in the production department, or can be relevant to payroll accounting in Human Resources. Additional information may be viewed at this time, such as why certain data has not been approved.

As stated above, CATS data is always related to individuals. This means that the person entering the data must either provide an employee number, or in the case of rapid record entry (entering similar or identical data across several employees), an employee number must be supplied for the record screen.

An administrator may enter data for several employees in one session. One possible method is to choose a list entry formation that allows the relevant data for all the employees to be entered at once. Another possible method is to select the employees from a list, and enter the data as a single record entry. Either way, the principal task of the person entering the data is to enter working times together with information relevant for the further processing and evaluation of the data in other applications, such as Human Resources. This information is known as working time attributes. The working time attributes being entered depend on the activities for which employees enter working times. The working time attributes can vary not only from one company to another, but also from one area of activity to another.

In a preferred embodiment, the working time attributes are entered in fields, some of which may have default values and some of which must contain data before an entry can be saved. The period covered by a data entry may vary, and in a preferred embodiment long periods, such as those associated with leaves of absence, may also be entered.

Figure 2:
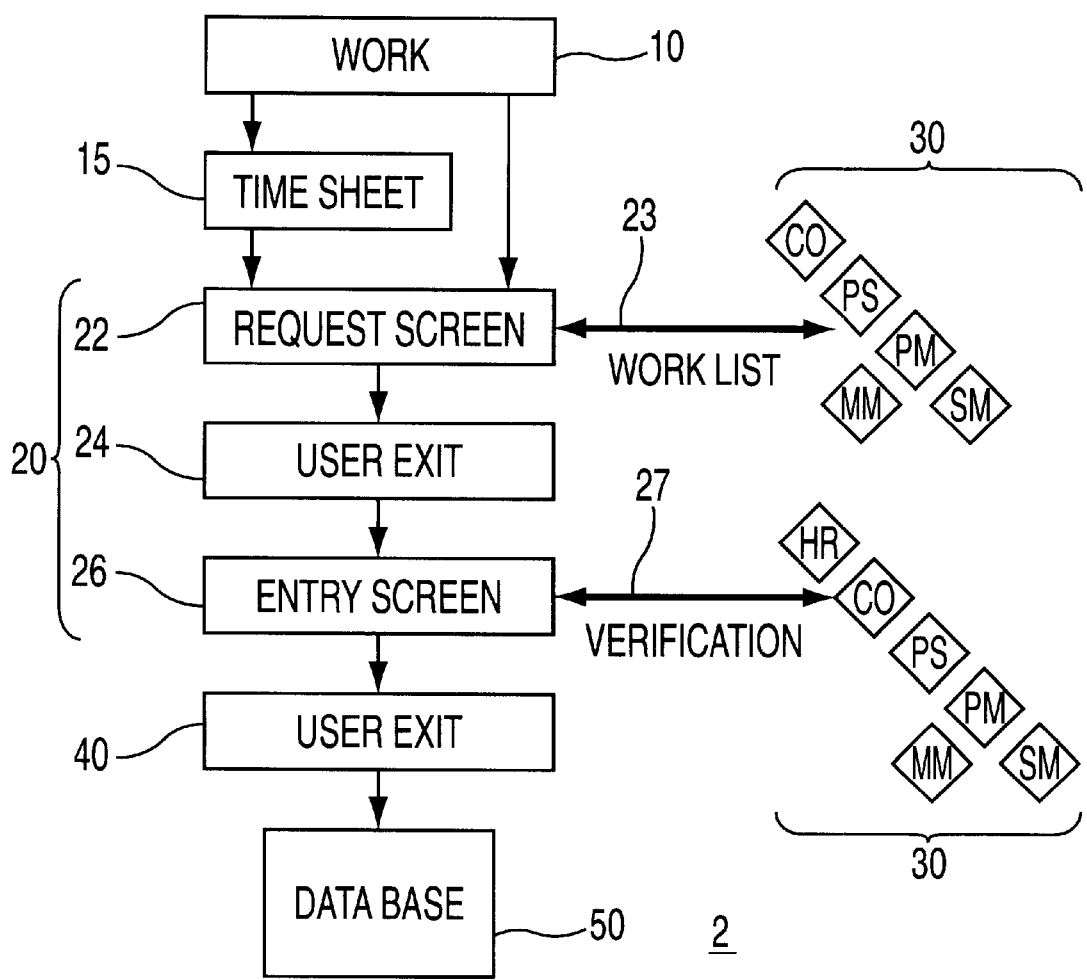
FIG. 2 is a flowchart providing a more detailed representation of the entering of raw data into a database.

Referring to FIG. 2, flowchart 2 represents a more detailed description of the entering of raw data into database 50. A user who wishes to record work 10 directly on the system or through time sheet 15 does so through CATS interface 20, which includes request screen 22 (which indicates to the user that CATS interface 20 is in request mode) and data entry screen 26 (which indicates to the user that CATS interface 20 is in data entry mode).

Figure 3:
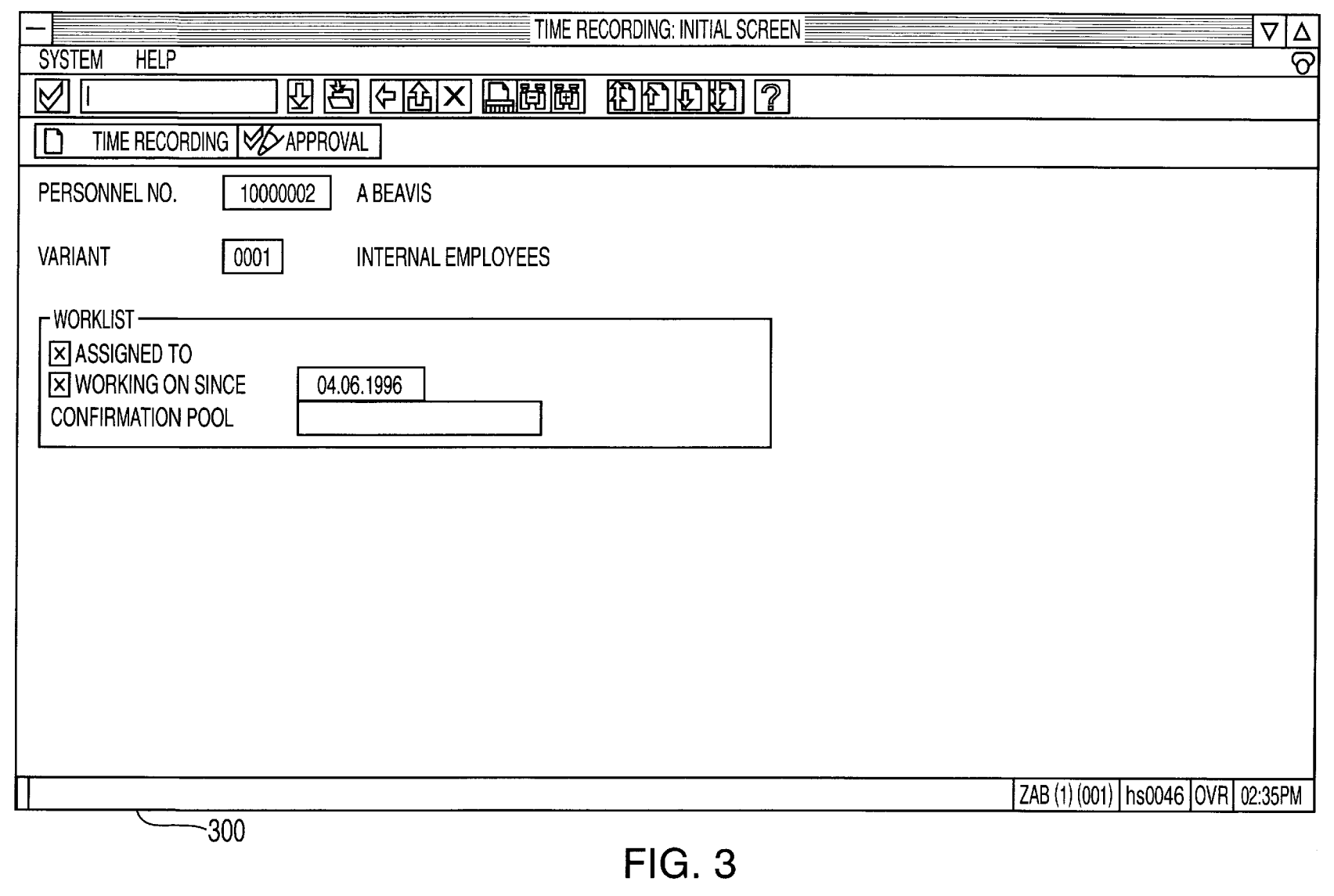

Referring to FIG. 3, initial screen 300 is an example of request screen 22. Initial screen 300 allows the entry of an employee number and the desired data entry variant. For example, in a preferred embodiment internal employees are assigned a data entry variant of "1", while external employees are assigned a data entry variant of "2". In alternative preferred embodiments, different categories, such as department, project, etc., are used to differentiate among data entry variants.

Work list check 23 is performed on the data that was inputted on request screen 22. Work list check 23 entails checking the data with one or more of applications 30 to determine the proper work list associated with the data. The work list in turn defines the data entry screens to be used. Thus, the data input on request screen 22 will determine the appearance of data entry screens that follow, and it allows these screens to be customized for different types of employees. In a preferred embodiment, additional customer enhancements may be applied using user exit 24.

Figure 4:
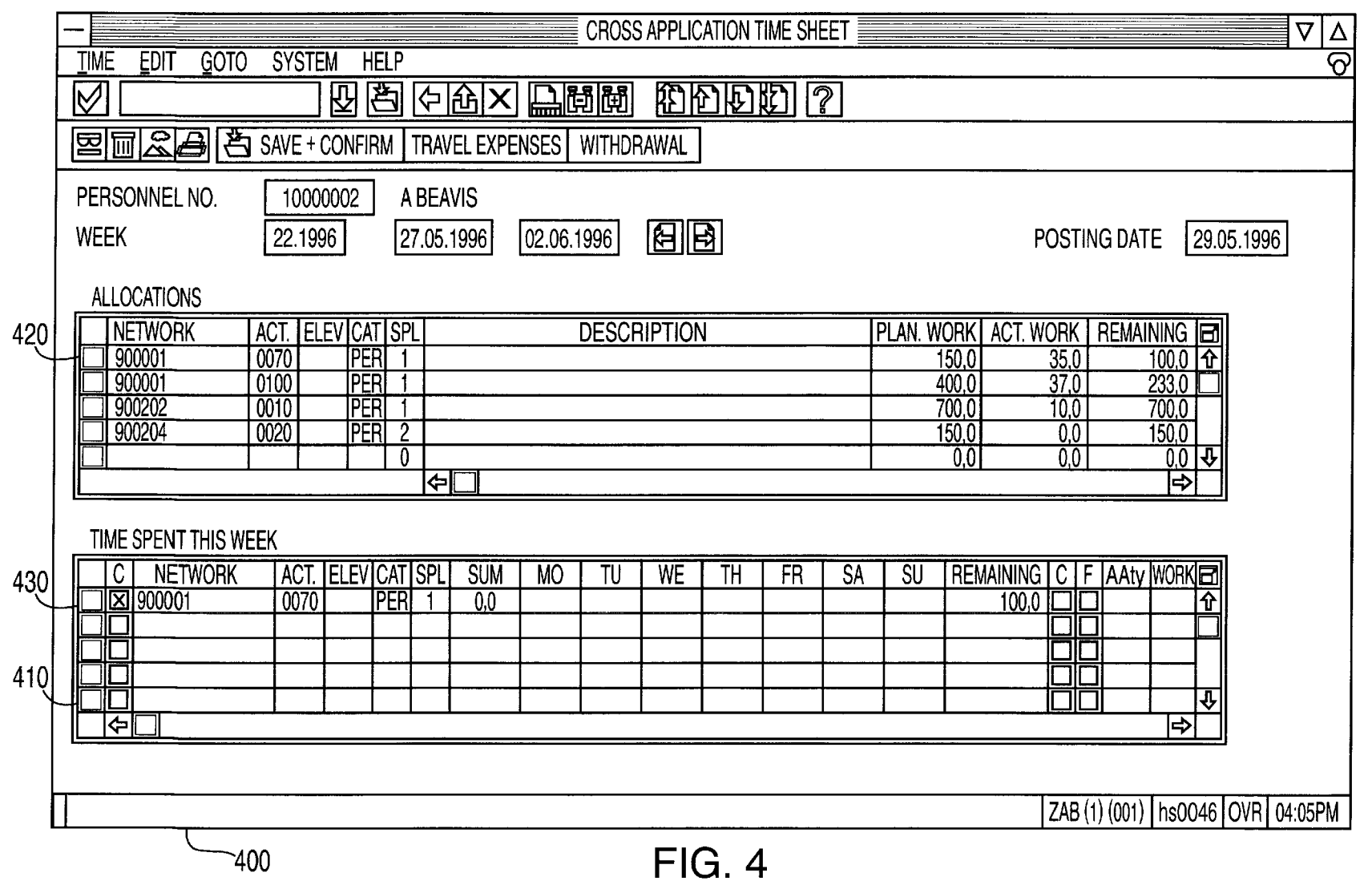

At least one data entry screen 26, determined by work list check 23, is subsequently displayed. Referring to FIG. 4, data entry screen 400 is an example of data entry screen 26. Data entry screen 400 allows the entry of the time worked on one or more days to be entered. Examples of the types of data that may be entered on data entry screen 26 include hours worked per day, beginning and end times of work performed each day, activity type, activity price, final confirmation indicator (boolean value indicating whether a particular task is completed), remaining work, plain text, type of attendance or absence, and trip number (reference to a particular trip). This list is by no means exhaustive, but is defined for each particular data entry screen 26.

Data entry screen 26 may also be used to specify various target objects (i.e., recipients of the data). Target objects are entities that model different business objects. Examples of target objects used with SAP R/3 include cost center, order/network, activity/activity element/split (between activity and activity element), WBS element, and sales order.

Data entry screen 26 may also be used to specify valid senders. Senders are cost centers responsible for performing some tasks or activities. Examples of valid senders used with SAP R/3 include cost center/activity type objects and purchase order number/purchase order item/service number objects.

In a preferred embodiment, administrative data such as the details of who entered or changed the data, and when it was changed or entered, are supplied automatically by the CATS system and do not have to be entered in data entry screen 26. Auxiliary functions make the system easier to use by allowing certain tasks to be performed simply, such as copying data from a work list to a data entry line, copying data from a data entry line to a work list, copying data from one data entry line to another, copying from one period (of time) to another period, and scrolling along a temporal axis with function keys or by entering temporal information (e.g., a date or a week number).

In a preferred embodiment, data entry screen 26 displays a spreadsheet or chart that resembles a time recording sheet with a horizontal time axis, as shown in chart 410 of data entry screen 400 and chart 510 of data entry screen 500 in FIG. 5. Depending on the customized settings, data entry screen 26 may show an employee's planned hours in the future (which may be laid down in a work schedule).

In a preferred embodiment, and again depending on the customized settings, a section of data entry screen 26 may display a work list. As described above, an auxiliary function may be used to copy data from the work list to a data entry line. For example, data entry screen 400 shows the result of the execution of a copy function, in which line 420 has been copied to line 430.

In a preferred embodiment of the invention, a time axis displayed on data entry screen 26 may be split into flexible periods for entering the data. For example, a period may cover a day, a month, or other length of time. Other features include the possibility of entering actual time of the day in which work is performed, distributing a specified number of hours over a given time period using a distribution function, allowing work schedule data (the target times) to be inputted directly as actual times, entering data for time periods that lie in the future, and entering time data for absences.

It should be noted that the form of data entry used will determined the appearance of data entry screen 26. Various screen fields may be hidden or displayed, and the user may be given some control over the layout of data entry screen 26.

Figure 6:
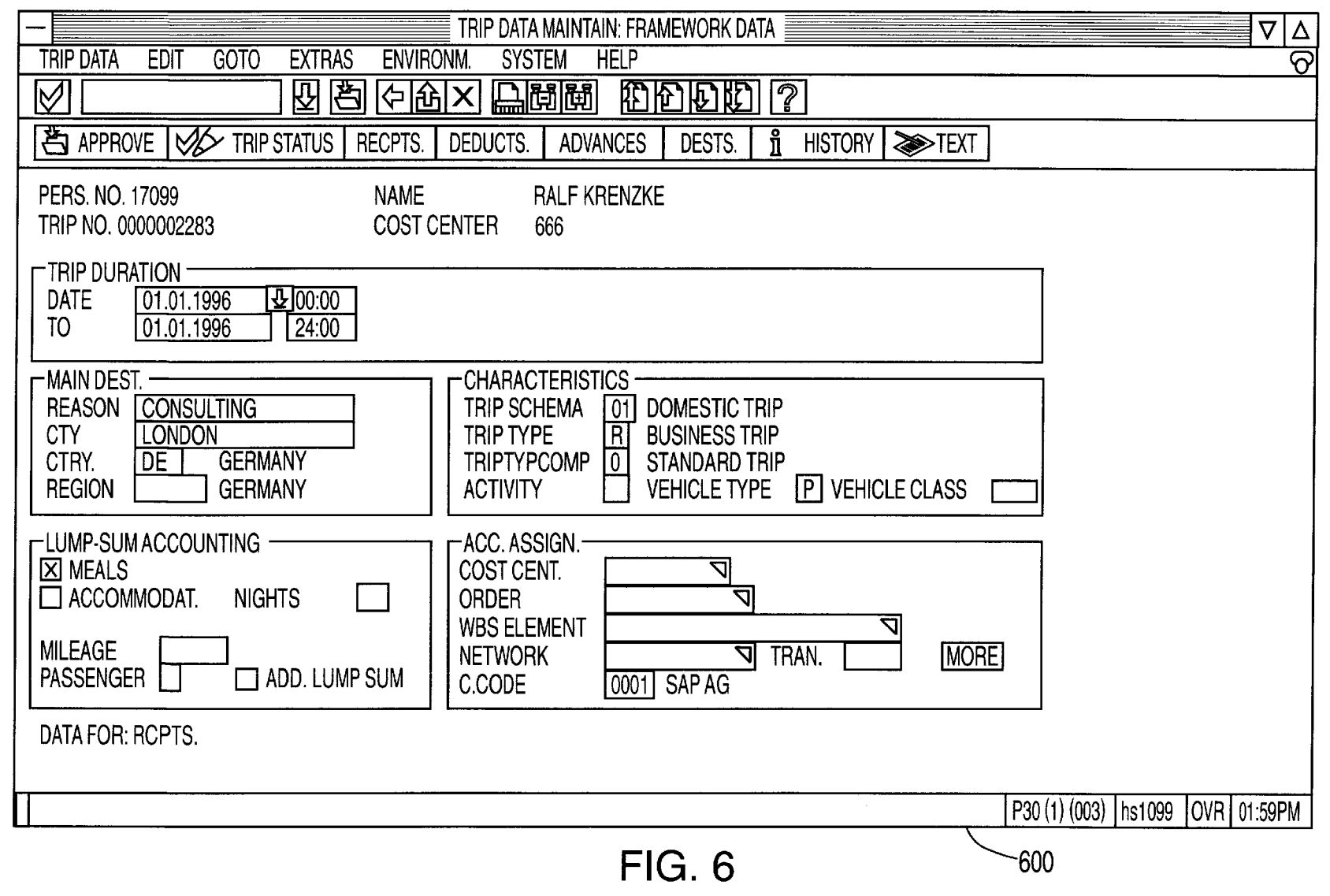

In a preferred embodiment, it is possible to navigate from data entry screen 26 to a travel expense data entry screen, an example of which is shown in FIG. 6. In travel data entry screen 600, original Personnel Time Management 31 functionality is available as a transaction call. Furthermore, references to trip numbers may be entered for reporting purposes. However, in this preferred embodiment, approval process or authorization procedure 65 is not used to approve business travel, which has a separate approval procedure.

Figure 7:
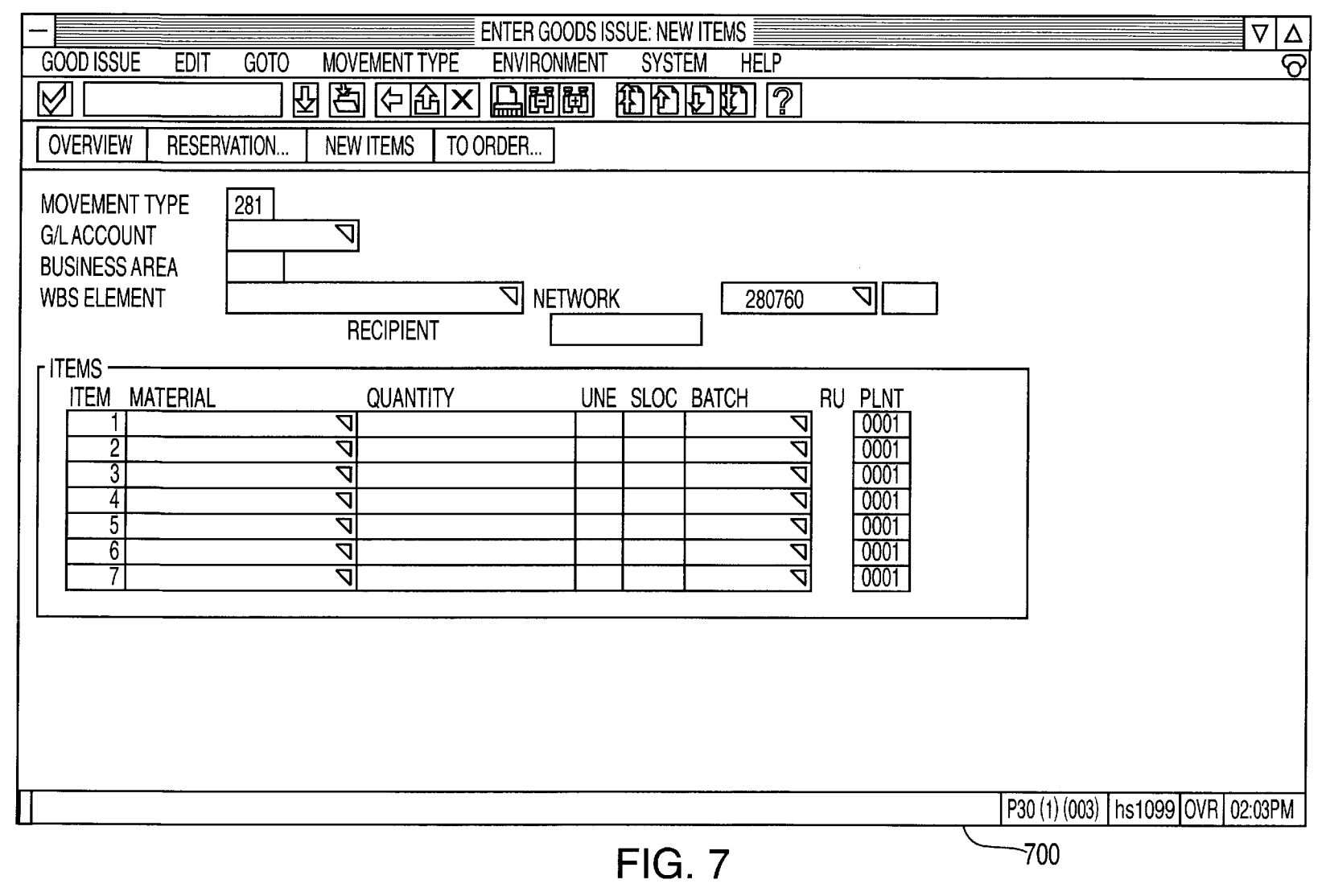

In a preferred embodiment, it is also possible to navigate from data entry screen 26 to a goods issue screen, an example of which is shown in FIG. 7. In goods issue screen 700, original External Services 32 functionality is available as a transaction call. The number of the goods issue document is stored in database 50.

In a preferred embodiment, actual costs may be determined based upon the data entered. In this embodiment, there are three methods available for determining the actual costs:

1) Actual costs may be calculated via the rate of the type of service involved. This corresponds to the current standard approach.
2) A rate (e.g., per hour) can be entered and the actual time can be evaluated using this rate. Any variances are noted separately in the costing receipt (separate cost receipt items).

3) The rate is determined via a user exit and the actual hours can then be evaluated using this rate. Any variances are noted separately in the costing receipt (separate cost receipt items). This technique allows the data to be obtained on a calculation that depends on the user exit or a customer-specific formula.

Note that in this embodiment if two different rates are used (e.g., normal compensation and overtime compensation), either two lines must be filled out in the time sheet and the appropriate rates must be applied to each, or two different activity types with different associated rates must be used.

Verification check 27 is performed on the data entered in data entry screen 26. Verification check 27 entails checking the data with one or more of applications 30 to determine that proper and sufficient data has been entered in data entry screen 26. Data entered in data entry screen 26 cannot be saved without passing verification check 27. Upon a determination by verification check 27 that proper and sufficient data has been entered, additional customer enhancements may be applied using user exit 24 in a preferred embodiment. The entered data is then stored in database 50.

Authorization and Approval

Figure 8:
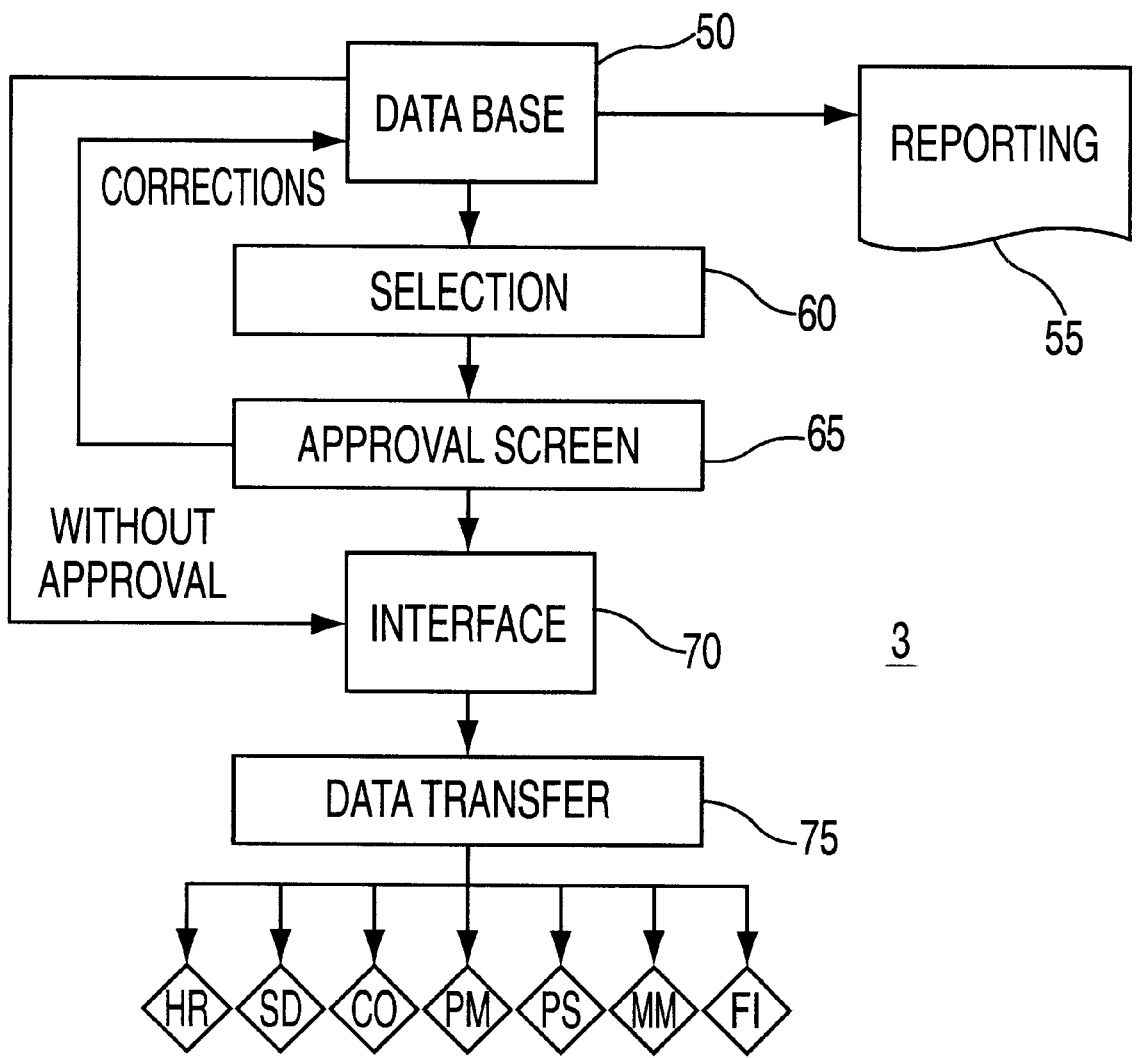
FIG. 8 is a flowchart providing a more detailed representation of authorizations and approvals.

Referring to FIG. 8, flowchart 3 represents a more detailed description of authorizations and approvals.

Authorization checks distinguish between two kinds of users: those who enter time data, and those who approve the data that was entered. It is the latter type of authorization check that applies to data residing in database 50. As stated above, if no approval or authorization is required, the data may be passed to interface database 70. However, if approval for any portion of the data is required, business workflow selection process 60 determines the type of approval and authorization that is required. Once business workflow selection process 60 determines the type of approval and authorization that is required for a given set of data, the data is displayed on an approval screen through approval process/authorization procedure 65.

An employee who approves the entered data must also have the transaction authorization to do so. The transaction authorization of a particular individual usually depends at least partially upon the identity of the employee whose time entry data needs to be approved (e.g., a supervisor is usually authorized to approve the time entry data of the employees he or she is supervising, but not authorized to approve the time entry data of employees not being supervised by him or her). In a preferred embodiment, such authorization information is stored in an organizational model, which contains relevant information, such as the organizational structure.

Authorizations may also be assigned on an object-specific basis (e.g., a particular individual or individuals have authorization to approve for a certain order type only). Authorizations may also be extended as required by individual customers using user exits (customer enhancements).

In a preferred embodiment, approval may be given by an authorized individual in a granular manner. By way of example only, an individual may approve time entry data of an individual employee, a given period of time entry data of an individual employee, or a given period for an organizational unit (e.g., an entire department's time entry data). Of course, the individual giving approval must be authorized to give such approval.

If approval is not given to a particular data entry, an explanation of the reason for the rejection can be attached to the data. In a preferred embodiment, if data is rejected, either the individual who entered the data or the employee for whom the data was entered is informed via work flow.

Approval procedures can be activated and deactivated by the system administrator, or someone else with the proper authorization, through customization.

Data Transfer

Figure 9:
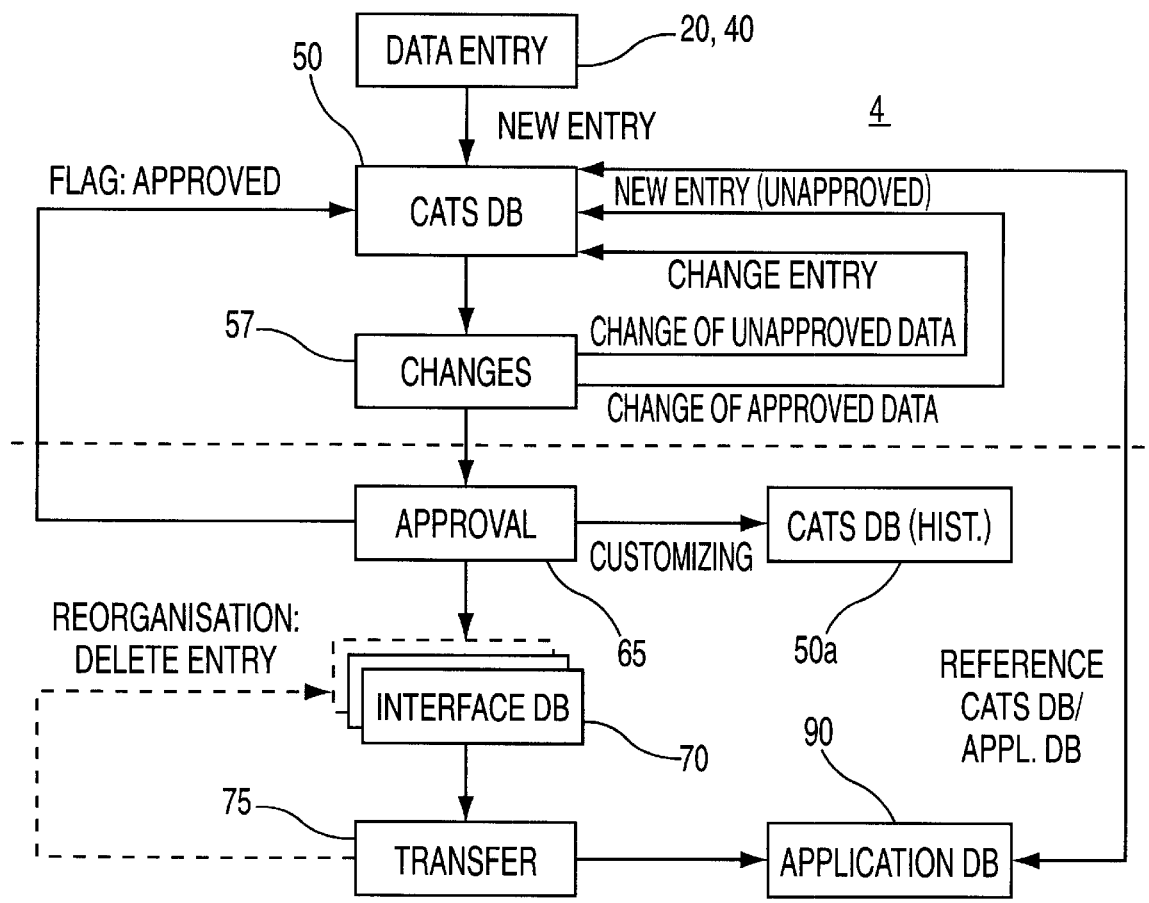
FIG. 9 is a flowchart providing a more detailed representation of transfer of data that initially requires approval.

Referring to FIG. 9, flowchart 4 shows the transfer of data that require approval. Upon a new entry of data via CATS interface 20 and application of user exit 40, the data is stored in database 50 without approval. As long as the data has not been approved, changes 57 to the data can be made, and changes 57 are reflected in database 50. Although changes 57 to data that has been approved may still be made, those changes 57 to approved data cause a new non-approved entry to be created in database 50. The new non-approved entry must go through the same approval process/authorization procedure 65 as the original data, and both sets of data are then transferred to the target application.

Upon completion of approval process/authorization procedure 65, data is written to interface database 70. In a preferred embodiment, interface database 75 contains interface tables for each of the applications 30 involved. The data residing in an interface table is fetched by their associated target application 30 in predetermined time intervals and stored in the target application database 90. In a preferred embodiment, once data has been transferred to target application database 90, the data is deleted from the associated interface table in interface database 70.

In a preferred embodiment, target application 30 is supplied with data according to the following rules:

1) If an operation number or an element number is entered, a completion confirmation is created and data associated with Controlling 34 is written indirectly.
2) If a recipient is entered without an operation number or an element number, data associated with Controlling 34 is written directly.
3) If a purchase order number or a purchase order item and a service number are entered, data associated with External Services 32 and with Controlling 34 is written indirectly.
4) If only the type of attendance or absence is entered, only data associated with Personnel Time Management 31 is written.

In a preferred embodiment, the CATS system may be customized to have data in database 50 copied into a second database 50a for historical data record keeping.

Customizing

Settings may be altered via customizing. For example, depending on the data entry variant being used, the following settings may be changed in entry screen 26: field selection, checks, functions (e.g., branching to a travel entry data screen or a goods issue screen), displaying the work list, displaying the work schedule, selection of recipients for work flow).

As stated above, approval procedures can be activated and deactivated. Also as stated above, the CATS system may be customized to have data in database 50 copied into a second database 50a for historical data record keeping.

Other Embodiments

While there have been shown and described and pointed out fundamental novel features of the invention as applied to embodiments thereof, it will be understood that various omissions and substitutions and changes in the form and details of the invention, as herein disclosed, may be made by those skilled in the art without departing from the spirit of the invention. It is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A cross application time sheet system comprising:
   (a) a first interface for displaying a request for employee identification and data entry variant information, receiving said employee identification and data entry variant information, displaying a data entry screen, and accepting employee time records comprising time entry data for at least one employee;
   (b) a work list check for selecting said data entry screen based upon said received employee identification and data entry variant information;
   (c) a verification check for verifying that said time entry data is complete for at least one of said at least one employee;
   (d) a database for storing said time entry data;
   (e) a subsystem for obtaining approval for a subset of said time entry data; and
   (f) a second interface receiving and storing said time entry data, said second interface being linked to a plurality of enterprise management applications, said time entry data being fetched by said applications from said second interface;
   said verification check verifying that the time entry data is complete by communicating with at least one of said plurality of enterprise management applications.

2. The cross application time sheet system of claim 1, wherein said selecting said data entry screen is further based upon information provided by said plurality of enterprise management applications.

3. The cross application time sheet system of claim 1, wherein said first database contains only time entry data that has been verified to be complete by said verification check.

4. The cross application time sheet system of claim 1, wherein said second interface contains only time entry data receiving said approval.

5. The cross application time sheet system of claim 1, wherein said subsystem obtains approval for a modified version of said subset of said time entry data.

6. The cross application time sheet system of claim 1, wherein said first interface displays a travel expense data entry screen and a goods issue screen.

7. A method of processing time entry data comprising the steps of:
   (a) displaying a request for employee identification and data entry variant information;
   (b) receiving said employee identification and data entry variant information;
   (c) selecting a data entry screen based upon said received employee identification and data entry variant information;
   (d) displaying said data entry screen;
   (e) accepting employee time records comprising time entry data for at least one employee;
   (f) verifying that said time entry data is complete for at least one of said at least one employee;
   (g) storing said time entry data in a database;
   (h) obtaining approval for a subset of said time entry data; and
   (i) storing said time entry data in a second database for fetching of said time entry data by a plurality of enterprise management applications linked to the database;
   said verification check verifying that the time entry data is complete by communicating with at least one of said plurality of enterprise management applications.

8. The method of processing time entry data of claim 7, wherein the step of selecting said data entry screen is further based upon information provided by said plurality of enterprise management applications.

9. The method of processing time entry data of claim 7, wherein said first database contains only time entry data that has been verified to be complete in step (f).

10. The method of processing time entry data of claim 7, further comprising the step of obtaining approval for a modified version of said subset of said time entry data.

11. The method of processing time entry data of claim 7, further comprising the step of displaying a travel expense data entry screen and a goods issue screen.

12. A cross application time sheet system comprising:
   (a) first interface means for displaying a request for employee identification and data entry variant information, receiving said employee identification and data entry variant information, displaying a data entry screen, and accepting employee time records comprising time entry data for at least one employee;
   (b) checking means for selecting said data entry screen based upon said received employee identification and data entry variant information;
   (c) means for verifying that said time entry data is complete for at least one of said at least one employee;
   (d) database means for storing said time entry data;
   (e) means for obtaining approval for a subset of said time entry data; and
   (f) second interface means for receiving from the database and storing said time entry data, said second interface means being linked to a plurality of enterprise management applications, and said time entry data being stored so as to be fetched by said applications;
   said verification check verifying that the time entry data is complete by communicating with at least one of said plurality of enterprise management applications.

13. The cross application time sheet system of claim 12, wherein said selecting said data entry screen is further based upon information provided by said plurality of enterprise management applications.

14. The cross application time sheet system of claim 12, wherein said database means only stores time entry data that has been verified to be complete by said means for verifying.

15. The cross application time sheet system of claim 12, wherein said second interface means only stores time entry data approved by said means for obtaining approval.

16. The cross application time sheet system of claim 12, wherein said first interface means displays a travel expense data entry screen and a goods issue screen.

17. A computer-readable medium having stored thereon a plurality of instructions, said plurality of instructions including instructions which, when executed by a processor, cause said processor to perform the steps of:
   (a) displaying a request for employee identification and data entry variant information;

(b) receiving said employee identification and data entry variant information;

(c) displaying a data entry screen;

(d) accepting employee time records comprising time entry data for at least one employee;

(e) selecting said data entry screen based upon said received employee identification and data entry variant information;

(f) verifying that said time entry data is complete for at least one of said at least one employee;

(g) storing said time entry data in a database;

(h) obtaining approval for a subset of said time entry data; and (i) storing said time entry data from said database in a second database for fetching of said time entry data by a plurality of enterprise management applications linked to the database;

said step of verifying including performing a verification check verifying that the time entry data is complete by communicating with at least one of said plurality of enterprise management applications.

18. The computer-readable medium of claim 17, wherein the step of selecting said data entry screen is further based upon information provided by said plurality of enterprise management applications.

19. The computer-readable medium of claim 17, wherein said first database contains only time entry data that has been verified to be complete in step (f).

20. The computer-readable medium of claim 17, wherein said plurality of instructions further include additional instructions which, when executed by said processor, cause said processor to perform the step of obtaining approval for a modified version of said subset of said time entry data.

21. The computer-readable medium of claim 17, wherein said plurality of instructions further include additional instructions which, when executed by said processor, cause said processor to perform the step of displaying a travel expense data entry screen and a goods issue screen.

22. A method of processing time entry data in an R/3 system comprising the steps of:

(a) displaying a request for employee identification and data entry variant information;

(b) receiving said employee identification and data entry variant information;

(c) displaying a data entry screen;

(d) accepting employee time records comprising time entry data for at least one employee;

(e) selecting said data entry screen based upon said received employee identification and data entry variant information;

(f) verifying that said time entry data is complete for at least one of said at least one employee;

(g) storing said time entry data in a database;

(h) obtaining approval for a subset of said time entry data; and (i) storing said time entry data from the database in a second database for fetching of said time entry data by a plurality of R/3 enterprise management applications;

said step of verifying including performing a verification check verifying that the time entry data is complete by communicating with at least one of said plurality of enterprise management applications.

23. A system for processing time entry data, said system comprising:

a first interface receiving time entry data representing work done by one or more workers;

a first database associated with the first interface, said first database receiving the time entry data from the first interface and storing said time entry data;

a second database to which said time entry data is passed from the first database;

a plurality of enterprise management applications supported in the system and linked to said second database;

said second database transferring said time entry data to the applications; and said first interface checking the time entry data with one or more of said enterprise management applications during entry of said time entry data.

24. The system of claim 23, wherein said first interface includes a data entry device, and said time entry data is entered through said data entry device.

25. The system of claim 23, and said first interface determining an appropriate work list for said time entry data based upon said checking.

26. The system of claim 23, and an approval subsystem linked between the first database and the second database, said approval subsystem obtaining approval for a subset of said time entry data, and said subset of said time entry data being passed to the second database only when approval is received.

27. The system of claim 23, and said first interface checking said time entry data including a verification check for verifying that the time entry data is complete for each worker.

28. The system of claim 23, wherein each of said plurality of enterprise management applications is supported on a respective server.

29. The system of claim 23, wherein each of said plurality of enterprise management applications has a respective database for storing the time entry data transferred from the second database.

30. The system of claim 23, wherein said second database stores said time entry data in a plurality of tables, wherein each of said plurality of tables is associated with a respective enterprise management application.

31. The system of claim 30 wherein the associated enterprise management application empties the respective table when the data is transferred therefrom.

32. The system of claim 23 wherein the plurality of enterprise management applications includes personnel time management, external services, project system, controlling, plant maintenance and service management applications.

33. The system of claim 23 wherein the system generates a report from the time entry data stored in the first database.

34. A method of processing time entry data, said method comprising:

receiving via a first interface time entry data representing work done by one or more workers;

communicating with one or more of said enterprise management applications during entry of said time entry data;

storing said time entry data in a first database associated with the first interface;

passing said time entry data to a second database;

transferring said time entry data from said second database to a plurality of enterprise management applications supported in the system and linked with said second database.

35. The method of claim 34, wherein said first interface includes a data entry device, said time entry data being entered through said data entry device.

36. The method of claim 35, wherein said time entry data includes an identification of said at least one worker and at least one time record for said at least one worker.

37. The method of claim 34, and further comprising determining an appropriate work list for said time entry data based upon said communicating with one or more of said enterprise management applications.

38. The method of claim 34, further comprising obtaining approval for a subset of said time entry data before passing said subset of said time entry data between the first database and the second database, said subset of said time entry data being passed to the second database only when said approval is received.

39. The method of claim 34, wherein said first interface verifies that the time entry data is complete for each of said at least one worker.

40. The method of claim 34, wherein each of said plurality of enterprise management applications is supported on a respective server and said transferring includes transmission of the time entry data to said servers.

41. The method of claim 34, wherein each of said enterprise management applications has a respective application database, the time entry data transferred from the second database being stored in each of said application databases.

42. The method of claim 34, wherein said storing in said second database includes storing said time entry data in a plurality of tables each associated with a respective application.

43. The method of claim 42 further comprising emptying at least one of said plurality of tables when the time entry data is transferred therefrom.

44. The method of claim 34 wherein the plurality of enterprise management applications includes personnel time management, external services, project system, controlling, plant maintenance and service management applications.

45. The method of claim 34 further comprising generating a report from the time entry data stored in the first database.

46. The method of claim 34 further comprising receiving corrected data in the second database from the plurality of enterprise management applications.

47. The method of claim 34 wherein said time entry data and travel expenses are associated by a trip number.

48. The cross application time sheet system of claim 1, wherein said time entry data and travel expenses are associated by a trip number.

49. The method of claim 7 further comprising receiving corrected data in the second database from the plurality of enterprise management applications.

50. The method of claim 7 wherein said time entry data and travel expenses are associated by a trip number.

51. The cross application time sheet system of claim 12, wherein the second interface means receives corrected data from the plurality of enterprise management applications.

52. The cross application time sheet system of claim 12, wherein said time entry data and travel expenses are associated by a trip number.

53. The computer-readable medium of claim 17, wherein said plurality of instructions further include additional instructions which, when executed by said processor, cause said processor to perform the step of receiving corrected data in the second database from the plurality of enterprise management applications.

54. The computer-readable medium of claim 17, wherein said time entry data and travel expenses are associated by a trip number.

55. The system of claim 23, wherein the second database receives corrected data from the plurality of enterprise management applications.

56. The system of claim 23, wherein said time entry data and travel expenses are associated by a trip number.

* * * * *